United States Patent [19]

Stupak, Jr.

[11] Patent Number: 4,518,881
[45] Date of Patent: May 21, 1985

[54] LINEAR MOTOR

[75] Inventor: Joseph J. Stupak, Jr., San Pedro, Calif.

[73] Assignee: Ibis Systems, Inc., West Lake Village, Calif.

[21] Appl. No.: 436,324

[22] Filed: Oct. 25, 1982

[51] Int. Cl.³ .............................................. H02K 33/02
[52] U.S. Cl. .......................................... 310/13; 310/27
[58] Field of Search ...................................... 310/12–14, 310/27

[56] References Cited

U.S. PATENT DOCUMENTS

| 2,832,903 | 4/1958 | Carter | 310/27 |
| 3,139,548 | 6/1964 | Dreyfuss | 310/27 |
| 3,417,269 | 12/1968 | Heller et al. | 310/27 |
| 3,577,023 | 5/1971 | Bleiman | 310/13 |
| 3,995,364 | 12/1976 | Kristiansen | 310/266 X |
| 4,318,038 | 3/1982 | Munehiro | 310/27 X |

OTHER PUBLICATIONS

*IBM Tech. Disclosure Bulletin,* "Linear Actuator with Shorted Turn, etc.", Hu, vol. 13, No. 4, 9/70.

*Primary Examiner*—Donovan F. Duggan
*Attorney, Agent, or Firm*—Flehr, Hohbach, Test, Albritton & Herbert

[57] ABSTRACT

A linear motor employing two spaced planar magnets which are removed from the bobbin and coil of the motor to thereby reduce heat transfer. The support structure for the magnets and bobbin are configured to facilitate magnetic flux transfer between an outer pole and an inner pole of the motor with a minimum of flux leakage. The gap between the inner pole and the outer pole which accommodates a bobbin and coil is configured to provide a generally uniform force on a bobbin when displaced by the motor and also increase the amount of force exerted on the bobbin by increasing the flux transfer. The magnets preferably comprise a plurality of magnetic blocks.

12 Claims, 11 Drawing Figures

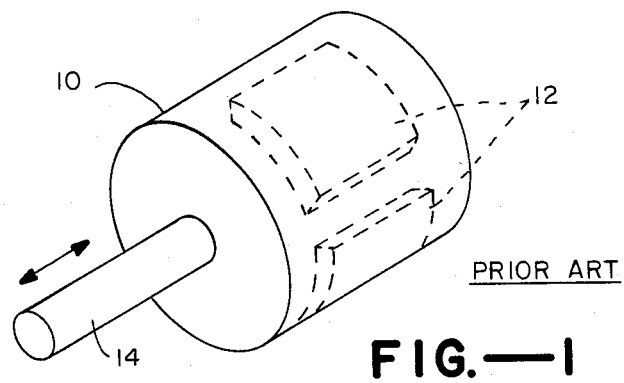
FIG.—1 PRIOR ART
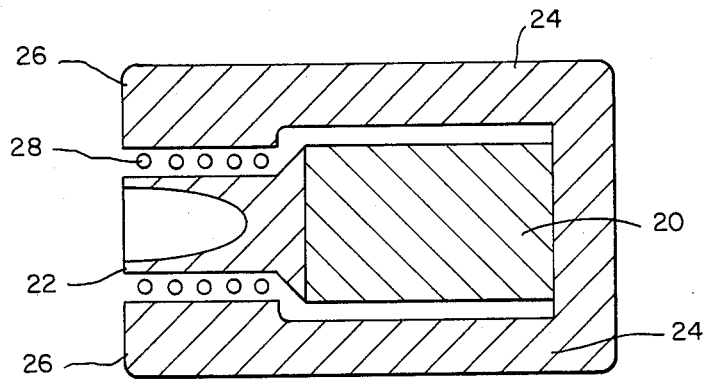
FIG.—2 PRIOR ART
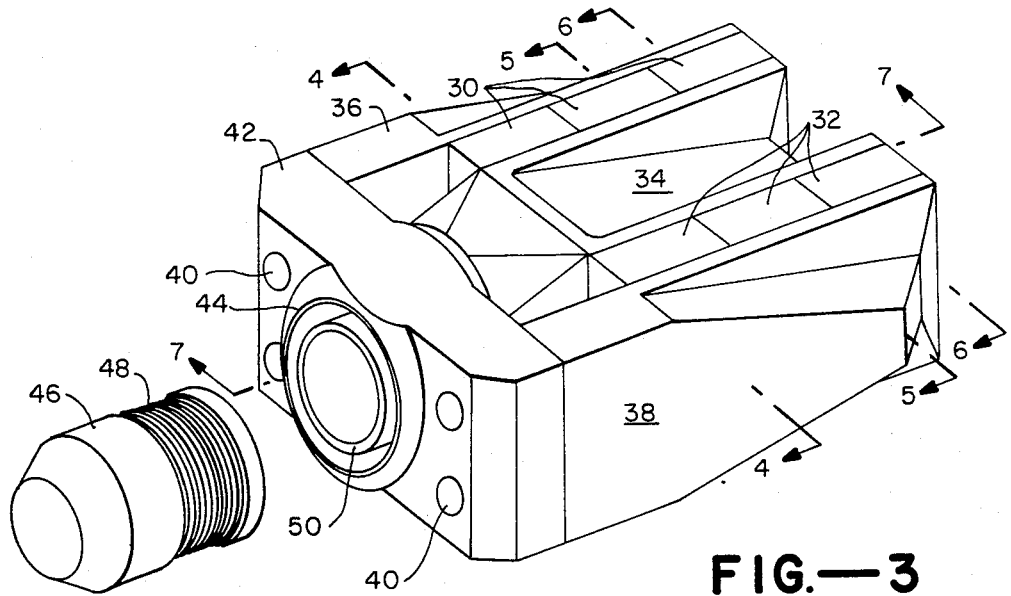
FIG.—3

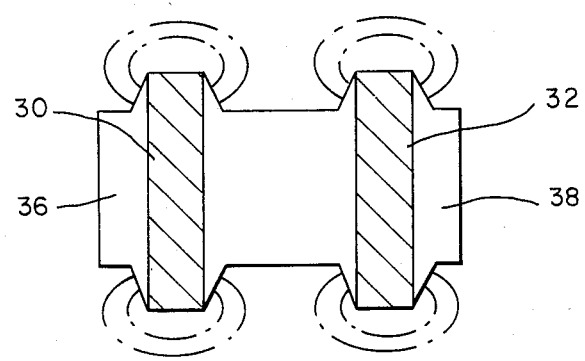
FIG.—4
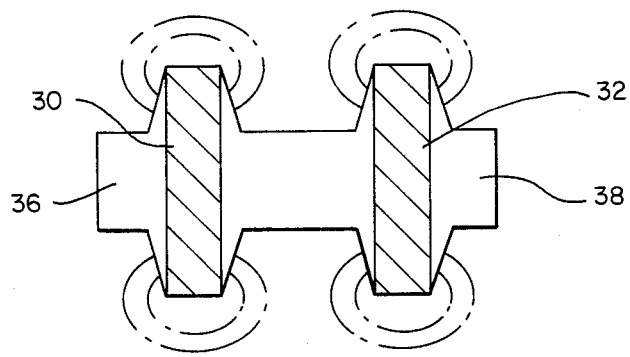
FIG.—5
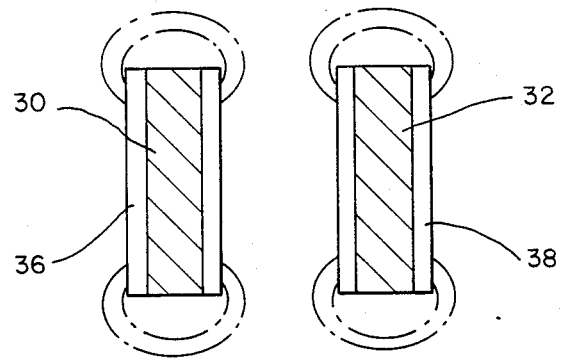
FIG.—6

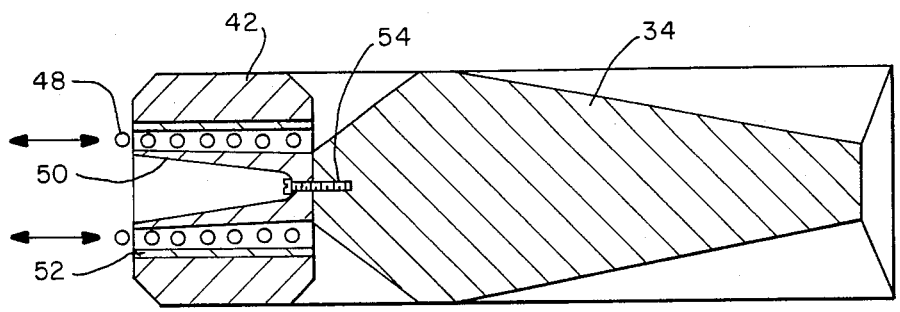
FIG.—7A
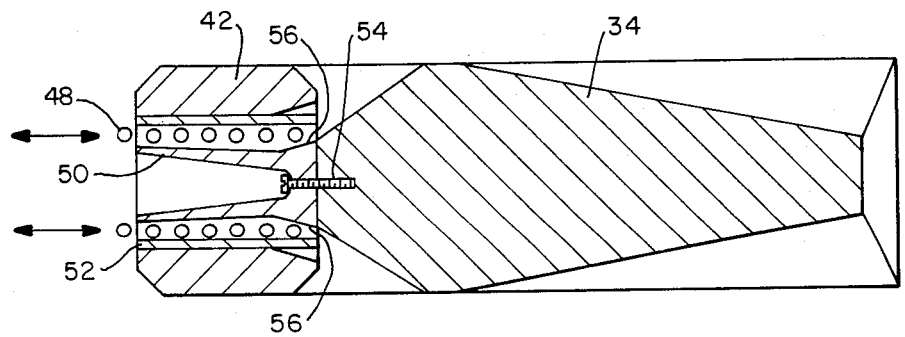
FIG.—7B
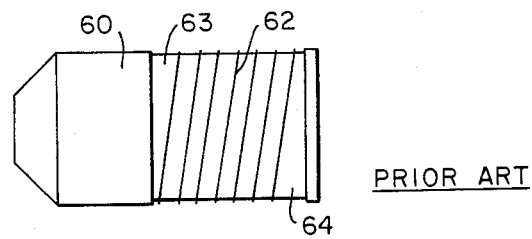
PRIOR ART
FIG.—8
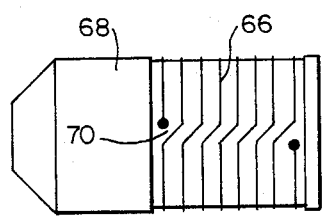
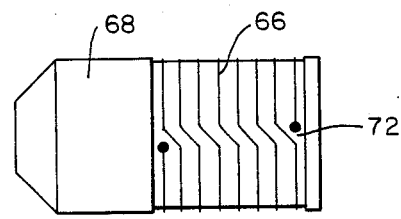
FIG.—9      FIG.—10

LINEAR MOTOR

This invention relates generally to linear motors such as used in magnetic disc drives.

Magnetic disc drives comprise a plurality of discs stacked in spaced parallel arrangement. The surfaces of the discs have magnetic coatings in which digital data (e.g. "1" or "0" bits) is stored by magnetizing portions of the coatings. The stored data is arranged in concentric circles or tracks on the disc surfaces, and magnetic pickup heads are moved across the disc surfaces to read and write the digital data.

Linear motors, sometimes called voice coil motors, are conventionally employed for driving the pickup head assembly. Such motors have magnets for establishing a magnetic field and a bobbin with a coil wound thereon is placed in the magnetic field. By applying current to the coil the bobbin can be moved rapidly in the magnetic field in a direction determined by the direction of current flow. Operation of the linear motor is similar to the operation of an acoustic amplifier employing a voice coil speaker.

Typically, the linear motor has a cylindrical housing with cylindrical segment magnets mounted on the interior surface of the housing. The segments are normally fabricated from a ceramic material which is readily available and relatively inexpensive as compared to other magnetic material such as Alnico. The bobbin is positioned within the cylindrical housing with the coil in close proximity to the magnetic assembly. By energizing the coil the bobbin will move linearly within the housing and thus move an attached pickup head carriage assembly with respect to the surfaces of the discs.

The magnetic cylindrical segments in such motors are difficult and expensive to fabricate. Often the segments do not have equal magnetic properties. Further, energization of the bobbin coil generates considerable heat which is readily transmitted to the magnetic segments in close proximity thereto. The heat alters the magnetic properties of the segments which can change the force imparted to the bobbin and thus make control of the linear motor more difficult.

Another linear motor embodiment heretofore employed uses a cylinder of Alnico in a magnetic structure for establishing a magnetic field through a coil coaxially aligned with the cylindrical magnet. While Alnico is a more powerful material than is ceramic, the Alnico is more expensive, is difficult to shape, and is sometimes not readily available.

The present invention is directed to a novel linear motor in which a plurality of magnet sections or blocks are employed. Such configurations of magnets allows the use of ceramic material with enhanced magnetic characteristics. Further, the blocks are positioned away from the bobbin and coil thereby reducing heat transfer to the magnets.

Advantageously, the components of the motor are arranged whereby the magnetic force of the magnets maintains assembly thereof.

The motor is compact and a plurality of motors can be readily stacked in a small space for driving a plurality of pickup head assemblies in a disc drive.

In accordance with a feature of the invention the support structure for the magnets provides a magnetic path to an outer pole around the bobbin, and the support structure is configured to reduce flux leakage.

In accordance with another feature of the invention an inner pole is provided about which the bobbin moves, and the outer pole and the inner pole define an air gap which is configured to enhance the power of the motor.

In accordance with another feature of the invention, the bobbin of the linear motor is provided with a coil which reduces wasted space on the bobbin.

The invention and objects and features thereof will be more readily apparent from the following detailed description and appended claims when taken with the drawing, in which:

FIG. 1 is a perspective view of one embodiment of a prior art linear motor.

FIG. 2 is a section view of a prior art linear motor in accordance with another embodiment.

FIG. 3 is a perspective view of one embodiment of a linear motor in accordance with the present invention.

FIGS. 4, 5, and 6 are section views of the linear motor of FIG. 3 taken along the lines 4—4, 5—5, and 6—6, respectively.

FIG. 7A is a section view of one embodiment of the linear motor of FIG. 3 taken along the line 4—4.

FIG. 7B is a section view of another embodiment of the linear motor of FIG. 3 taken along the line 4—4.

FIG. 8 is a side view of a linear motor bobbin in accordance with the prior art.

FIG. 9 is a side view of a linear motor bobbin and one layer of a coil thereon in accordance with the invention.

FIG. 10 is a side view of the bobbin of FIG. 9 illustrating a second layer of coil.

Referring now to the drawings, FIG. 1 is a perspective view of one embodiment of a linear motor in accordance with the prior art. Such a linear motor has a generally cylindrical housing 10 with a plurality of generally cylindrical magnet sections 12 mounted on an inner surface of the housing 10. A bobbin (not shown) is positioned within housing 10, and a shaft 14 attached to the bobbin extends outwardly from the housing 10. The shaft 14 is moved axially, as indicated, by the energization of a coil wound about the bobbin. U. S. Pat. No. 4,305,105 describes one such prior art linear motor.

As briefly described above, the magnet segments 12 are typically made of a ceramic material which is relatively inexpensive and readily available. However, the magnet segments, having magnetic poles defined on the inner and outer surfaces thereof, are relatively difficult of fabricate. Further, the segments are placed in close proximity to the bobbin and winding, and heat generated by energization of the coil can be readily transmitted to the magnet segments thereby affecting the magnetic properties thereof and offering the force generated on the bobbin. Generally, control of the linear motor in positioning pickup head assemblies in a disc drive is thereby complicated.

FIG. 2 is a cross section view of another embodiment of a prior art linear motor in which a generally cylindrical magnet 20 is positioned coaxially with an inner pole member 22. The housing 24 provides a flux transmission path from the magnet 20 to the outer pole 26 positioned about the inner pole 22. The coil 28 is positioned in the inner gap between the inner pole 22 and the outer gap 26. An inner portion of the center pole 22 is normally removed to improve the uniformity of the force generated on the coil 22 as it is moved axially in the air gap. Again, the magnet 20 is placed in close proximity to the bobbin and coil 28, and heat generated during energization of the coil is readily transmitted to the magnet 20.

FIG. 3 is a perspective view of one embodiment of a linear motor in accordance with the present invention which employs two spaced generally planar magnetic means in a configuration which minimizes heat transfer from the coil to the magnetic means and which also facilitates more uniform magnetic flux transmission to the coil and also increases the force generated by the motor. In this embodiment the first magnetic means includes a plurality of magnetic blocks 30 and the second magnetic means comprises a plurality of magnetic blocks 32. The blocks are more easily fabricated and magnetized, and variations in magnetic properties of the blocks can be compensated by using a plurality of blocks for each magnetic means. The magnetic blocks 30 and 32 are supported between a back portion 34 of a center pole and side members 36 and 38 of the outer pole. The side members 36 and 38 are affixed by suitable means such as bolts 40 to a front member 42 of the outer pole. Member 42 has a generally cylindrical opening shown at 44 which receives a bobbin 46 which has generally cylindrical inner and outer surfaces and a coil 48 wound on the outer surface. Positioned within the opening 44, and about which the bobbin 46 axially moves, is a generally cylindrical portion 50 of the center pole.

Advantageously, the magnetic blocks 30 and 32 are spaced from the bobbin 46, and heat transfer from the bobbin and coil to the magnetic blocks is thereby reduced. Further, use of magnetic blocks facilitates manufacture of the magnets and improves the magnetic properties thereof. The magnetic poles of the blocks 30 and 32 tend to maintian assembly of the motor. It will be noted that the edges of the side members 36 and 38 are tapered to minimize flux leakage from the side members back to the magnetic blocks 30, 32. A similar tapering of the upper and lower edges of the center pole 34 is provided to minimize flux leakage.

FIGS. 4, 5, and 6 are section views of the linear motor of FIG. 3 taken along the lines 4—4, 5—5, and 6—6, respectively, and further illustrate the design of the magnetic circuit to reduce flux leakage. The center pole and side members of the outer pole have a nearly linear increase in cross-sectioned area from back to front along the lengths of the magnetics; however, the cross-sections are configured to minimize flux leakage, carry the flux through the side members along their lengths without excessive reluctance loss, and maintain the overall motor configuration within a limited and defined space.

The flux leakage is minimized by increasing the flux leakage path distance, and specifically by maximizing the reluctance $$R = \int [dl/A(l)]$$

where A(l) is the cross-sectional area as a function of l across a tube the walls of which are parallel to flux lines and the area, A, being very small.

Reluctance loss within the pole pieces is minimized by the nearly linear relationship of cross-sectional area versus distance along the lengths of the magnets. Maximum cross-sectional area of the side members is at the front edge of the magnets, and as illustrated in FIGS. 4, 5, and 6 the cross-sectional area decreases along the lengths of the magnets.

As noted in FIG. 4, the leakage flux paths are relatively long due to the tapered edges of the pole pieces. Since the leakage reluctance (air) is increased the flux leakage is reduced. In FIG. 5 the leakage flux paths are further increased while the cross-sectional area in the center portion is increased to accommodate the increased interval flux. Near the end of the side members and center pole the cross-sectional area is small and the leakage flux paths are as long as possible.

FIGS. 7A and 7B are section views of two embodiments of the motor of FIG. 3 taken along the section line 4—4 and further illustrate the positioning of the coil 48 in the opening 44 of the front portion 42 of the outer pole and about the cylindrical portion 50 of the center pole. The cylindrical portion 50 is preferably a separate piece from the back portion 34 and is joined by a suitable fastener such as bolt 54. As known in the prior art, the center of the cylindrical center pole portion 50 is removed to alter magnetic flux transmission and thereby adjust the force versus distance curves as the coil 48 moves both inwardly and outwardly within the motor. Additionally, in FIG. 4A the outer surface of the cylinder portion 50 tapers inwardly thereby increasing the spacing between the cylindrical inner pole 50 and the outer pole 42 to further adjust the force-distance characteristics as the bobbin moves in the linear motor, as is known in the prior art. To decrease current rise and fall times after applying or removing supply voltage, a shorted conductive turn 50 is provided in the air gap between the inner pole and the outer pole. Use of the shorted turn is heretofore known, and the shorted turn can be provided on the surface of the inner pole (as is typical in the prior art) or on the surface of the outer pole as shown in FIGS. 4A and 4B.

FIG. 7B is a section view of an alternative embodiment which is similar to FIG. 7A but includes a feature of the invention which increases the force of the magnetic motor on the bobbin. In this embodiment the tapered outer surface of the cylindrical portion 50 of the center pole has a reverse taper at 56 near the contact of the front center pole 50 with the back portion 34, thereby facilitating flux transfer from the cylindrical portion 50 to the back portion 34 and thence to the magnets 30 and 32. With such a configuration the inner surface of the outer pole 42 must also be bent, or tapered, to maintain the gap spacing between the inner and outer poles and thus the desired flux transfer density between the two facing surfaces. It has been discovered that by so increasing the contact area between the front center pole 50 and the back center pole 34 the increased flux transfer will provide a significant increase in driving force to the bobbin and pickup head carriage assembly.

FIG. 8 is a side view of a bobbin 60 having a coil 62 wound thereon in accordance with the prior art. It will be noted that the turns of coil 62 are inclined at an angle with respect to the axis of the bobbin and the angle of inclination creates wasted space at 63 and 64 on the bobbin where the coil conductor is not placed.

In accordance with another feature of the invention the coil winding has an increased number of turns and increased actuation force is realized. This feature is illustrated in FIG. 9 where the turns of coil 66 on bobbin 68 are wound perpendicular to the axis of the bobbin so that the wasted space 63 and 64 of FIG. 5 is now avoided. It will be noted that adjacent turns of the coil are joined by a limited transition portion 70 of the conductor.

FIG. 10 is a side view of the bobbin of FIG. 9 showing a second layer of turns of the coil 66 also arranged perpendicular to the axis of the bobbin 68. Again, a limited transition portion 72 joins adjacent turns, and it will be noted that the transition 72 of the second layer of the coil are placed above the transition 70 of the first layer of the coil in FIG. 9.

The linear motor in accordance with the present invention is compact, and a plurality of linear motors can be readily stacked in a small space as may be required in driving a plurality of pickup head assemblies in a disc drive array. The use of magnetic blocks provides more uniform magnetic flux in the motor as well as facilitates manufacture of the magnets. Further, removal of the magnets from the bobbin and coil reduces the amount of heat transfer to the magnets. The force of the magnets tends to maintain assembly of the linear motor. In the preferred embodiment in which the front center pole has a reversed taper to increase flux transfer, an increase in motor power is realized. Further, use of a bobbin and coil with turns aligned perpendicualar to the axis of the bobbin minimizes wasted space on the bobbin and increases the drive force realized by the motor.

While the invention preferably employs a cylindrical bobbin and generally cylindrical outer pole and inner pole surfaces, the invention can be practiced using a bobbin having a generally rectangular cross section or other geometric shape and with poles having complementary shapes. Thus, as used herein and in the claims, these alternative configurations are considered to be equivalent to the cylindrical shape and description of the configurations as being generally cylindrical includes the alternative geometric shapes. Accordingly, while the invention has been described with reference to specific embodiments, the description is illustrative of the invention and is not to be construed as limiting the invention. Various modifications and applications may occur to those skilled in the art without departing from the true spirit and scope of the invention as defined by the appended claims.

What is claimed is:

1. A linear motor comprising
    a center pole of magnetic material including a front generally cylindrical portion and a back portion,
    an outer pole of magnetic material including first and second side members and a front portion, said side members being affixed to said front portion for transmission of magnetic flux, said front portion having a generally cylindrical opening with said front center pole portion positioned therein and defining a generally cylindrical gap between said front portion of said outer pole and said front portion of said center pole,
    said side members of said outer pole and said back portion of said center pole being tapered (near the outer edges thereof) with the cross-sections of said side members being largest near said front portions and decreasing away from said front portions to facilitate uniform flux transmission, said side members and said back portion being tapered near the edges thereof to minimize magnetic flux leakage back to said magnet means,
    a bobbin having generally cylindrical inner and outer surfaces positioned in said generally cylindrical gap, said bobbin including a coil, and
    first and second generally planar magnet means supported between said back portion of said center pole and said first and second side members, respectively, with said first and second magnet means being in spaced and generally parallel alignment thereby defining magnetic paths through said side members to said front portion of said outer pole, across said generally cylindrical gap, and to said center pole.

2. The linear motor as defined by Claim 1 wherein each of said magnetic means comprises a plurality of magnet blocks.

3. The linear motor as defined by claim 1 wherein the cross-sectional area of said side members decreases along the length of said magnetic means.

4. The linear motor as defined by claim 1 and further including a shorted conductive turn member in said gap.

5. The linear motor as defined by claim 4 wherein a shorted conductive turn member is positioned on said generally cylindrical opening of said front portion of said outer pole.

6. The linear motor as defined by claim 1 wherein the outer surface of said generally cylindrical portion of said center pole tapers inwardly, and an inner portion of said generally cylindrical portion is removed.

7. The linear motor as defined by claim 6 wherein removal of said inner portion defines a generally parabolic inner surface in said generally cylindrical portion of said center pole.

8. The linear motor as defined by claim 7 wherein said outer surface, after tapering inwardly, tapers outwardly towards said back portion of said center pole thereby increasing the flux transmission between said front portion and said back portion of said center pole.

9. The linear motor as defined by claim 8 wherein the surface of said generally cylindrical opening in said outer pole tapers to maintain a generally uniform spacing with the outward taper of said outer surface of said generally cylindrical portion of said center pole.

10. The linear motor as defined by claim 1 wherein said generally cylindrical opening of said front portion of said outer pole tapers to define an opening portion extending inwardly.

11. A linear motor comprising
    a center pole of magnetic material including a front generally cylindrical portion and a back portion,
    an outer pole of magnetic material including first and second side members and a front portion, said side members being affixed to said front portion for transmission of magnetic flux, said front portion having a generally cylindrical opening with said front center pole portion positioned therein and defining a generally cylindrical gap between said front portion of said outer pole and said front portion of said center pole,
    a bobbin having generally cylindrical inner and outer surfaces positioned in said generally cylindrical gap, said bobbin including a coil, said coil being wound on said outer surface of said bobbin and comprising a plurality of turns of a conductor with each turn oriented perpendicular to the direction of travel of said bobbin with adjacent turns of said coil being jointed by a limited transition portion of said conductor which is oriented at an acute angle to the direction of movement of said bobbin, and
    first and second generally planar magnet means supported between said back portion of said center pole and said first and second side members, respectively, with said first and second magnet means being in spaced and generally parallel alignment thereby defining magnetic paths through said side members to said front portion of said outer pole, across said generally cylindrical gap, and to said center pole.

12. The linear motor as defined by claim 11 wherein said conductor has a generally rectangular cross section.

* * * * *